US008959172B2

(12) United States Patent
Blocksome

(10) Patent No.: US 8,959,172 B2
(45) Date of Patent: Feb. 17, 2015

(54) SELF-PACING DIRECT MEMORY ACCESS DATA TRANSFER OPERATIONS FOR COMPUTE NODES IN A PARALLEL COMPUTER

(75) Inventor: Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1914 days.

(21) Appl. No.: 11/829,339

(22) Filed: Jul. 27, 2007

(65) Prior Publication Data

US 2009/0031002 A1  Jan. 29, 2009

(51) Int. Cl.
*G06F 15/167* (2006.01)
*G06F 13/28* (2006.01)

(52) U.S. Cl.
CPC .................................... *G06F 13/28* (2013.01)
USPC ....................................................... 709/212

(58) Field of Classification Search
USPC ........................................................ 709/212
See application file for complete search history.

(56) References Cited

U.S. PATENT DOCUMENTS

| | | | |
|---|---|---|---|
| 4,933,840 A | 6/1990 | Sera et al. | |
| 4,933,846 A | 6/1990 | Humphrey et al. | |
| 5,050,162 A | 9/1991 | Golestani | |
| 5,083,265 A | 1/1992 | Valiant | |
| 5,136,582 A | 8/1992 | Firoozmand | |
| 5,437,042 A | 7/1995 | Culley et al. | |
| 5,448,698 A | 9/1995 | Wilkes | |
| 5,617,537 A * | 4/1997 | Yamada et al. | 709/214 |
| 5,630,059 A | 5/1997 | Brady et al. | |
| 5,680,116 A | 10/1997 | Hashimoto et al. | |
| 5,689,509 A | 11/1997 | Gaytan et al. | |
| 5,721,921 A | 2/1998 | Kessler et al. | |
| 5,758,075 A | 5/1998 | Graziano et al. | |
| 5,781,775 A | 7/1998 | Ueno | |
| 5,790,530 A * | 8/1998 | Moh et al. | 370/363 |
| 5,796,735 A | 8/1998 | Miller et al. | |
| 5,802,366 A | 9/1998 | Row et al. | |
| 5,928,351 A | 7/1999 | Horie et al. | |
| 5,954,794 A | 9/1999 | Fishler et al. | |
| 5,961,659 A | 10/1999 | Benner | |
| 6,070,189 A | 5/2000 | Bender et al. | |

(Continued)

OTHER PUBLICATIONS

U.S. Appl. No. 11/776,707, filed Jul. 12, 2007, Blocksome (Continued)

*Primary Examiner* — Jeong S Park
(74) *Attorney, Agent, or Firm* — Biggers Kennedy Lenart Spraggins, LLP

(57) ABSTRACT

Methods, apparatus, and products are disclosed for self-pacing DMA data transfer operations for nodes in a parallel computer that include: transferring, by an origin DMA on an origin node, a RTS message to a target node, the RTS message specifying an message on the origin node for transfer to the target node; receiving, in an origin injection FIFO for the origin DMA from a target DMA on the target node in response to transferring the RTS message, a target RGET descriptor followed by a DMA transfer operation descriptor, the DMA descriptor for transmitting a message portion to the target node, the target RGET descriptor specifying an origin RGET descriptor on the origin node that specifies an additional DMA descriptor for transmitting an additional message portion to the target node; processing, by the origin DMA, the target RGET descriptor; and processing, by the origin DMA, the DMA transfer operation descriptor.

18 Claims, 9 Drawing Sheets

(56) References Cited

U.S. PATENT DOCUMENTS

| | | | |
|---|---|---|---|
| 6,072,781 | A | 6/2000 | Feeney et al. |
| 6,085,303 | A | 7/2000 | Thorson et al. |
| 6,105,122 | A | 8/2000 | Muller et al. |
| 6,161,198 | A | 12/2000 | Hill et al. |
| 6,356,951 | B1 | 3/2002 | Gentry, Jr. |
| 6,711,632 | B1 | 3/2004 | Chow et al. |
| 6,735,662 | B1 | 5/2004 | Conner |
| 6,744,765 | B1 | 6/2004 | Dearth et al. |
| 6,754,732 | B1 | 6/2004 | Dixon et al. |
| 6,857,030 | B2 | 2/2005 | Webber |
| 6,977,894 | B1 | 12/2005 | Achilles et al. |
| 6,981,074 | B2 | 12/2005 | Oner et al. |
| 7,031,305 | B1 | 4/2006 | Yu et al. |
| 7,054,958 | B2 | 5/2006 | Iyer et al. |
| 7,089,289 | B1 | 8/2006 | Blackmore et al. |
| 7,111,092 | B1 | 9/2006 | Mitten et al. |
| 7,120,916 | B1 | 10/2006 | Firth et al. |
| 7,155,541 | B2* | 12/2006 | Ganapathy et al. ............ 710/24 |
| 7,805,546 | B2 | 9/2010 | Archer et al. |
| 7,827,024 | B2 | 11/2010 | Archer et al. |
| 7,836,143 | B2 | 11/2010 | Blocksome et al. |
| 7,890,670 | B2 | 2/2011 | Archer et al. |
| 8,219,659 | B2 | 7/2012 | O'Neal et al. |
| 2001/0029556 | A1* | 10/2001 | Priem et al. ..................... 710/23 |
| 2003/0233497 | A1* | 12/2003 | Shih ............................... 710/22 |
| 2004/0057380 | A1* | 3/2004 | Biran et al. .................... 370/235 |
| 2004/0078405 | A1 | 4/2004 | Bhanot et al. |
| 2004/0218631 | A1 | 11/2004 | Ganfield |
| 2005/0033874 | A1 | 2/2005 | Futral et al. |
| 2005/0078669 | A1 | 4/2005 | Oner |
| 2005/0091334 | A1 | 4/2005 | Chen et al. |
| 2005/0114561 | A1 | 5/2005 | Lu et al. |
| 2005/0198113 | A1 | 9/2005 | Mohamed et al. |
| 2005/0213570 | A1 | 9/2005 | Stacy et al. |
| 2006/0045005 | A1 | 3/2006 | Blackmore et al. |
| 2006/0045109 | A1 | 3/2006 | Blackmore et al. |
| 2006/0047771 | A1 | 3/2006 | Blackmore et al. |
| 2006/0056405 | A1 | 3/2006 | Chang et al. |
| 2006/0075057 | A1* | 4/2006 | Gildea et al. .................. 709/212 |
| 2006/0150010 | A1 | 7/2006 | Stiffler et al. |
| 2006/0161733 | A1 | 7/2006 | Beckett et al. |
| 2006/0161737 | A1 | 7/2006 | Martin et al. |
| 2006/0190640 | A1 | 8/2006 | Yoda et al. |
| 2006/0206635 | A1 | 9/2006 | Alexander et al. |
| 2006/0218429 | A1 | 9/2006 | Sherwin et al. |
| 2006/0230119 | A1 | 10/2006 | Hausauer et al. |
| 2006/0253619 | A1 | 11/2006 | Torudbakken et al. |
| 2007/0041383 | A1 | 2/2007 | Banikazemi et al. |
| 2007/0165672 | A1 | 7/2007 | Keels et al. |
| 2008/0022079 | A1 | 1/2008 | Archer et al. |
| 2008/0101295 | A1 | 5/2008 | Tomita et al. |
| 2008/0109573 | A1* | 5/2008 | Leonard et al. ................ 710/24 |
| 2008/0222317 | A1 | 9/2008 | Go et al. |
| 2008/0273543 | A1 | 11/2008 | Blocksome et al. |
| 2009/0006808 | A1 | 1/2009 | Blumrich et al. |
| 2009/0019190 | A1 | 1/2009 | Blocksome |
| 2009/0031001 | A1 | 1/2009 | Archer et al. |
| 2009/0031002 | A1 | 1/2009 | Blocksome |
| 2009/0125604 | A1 | 5/2009 | Chang et al. |
| 2009/0276582 | A1 | 11/2009 | Furtek et al. |
| 2010/0082848 | A1 | 4/2010 | Blocksome et al. |
| 2010/0232448 | A1 | 9/2010 | Sugumar et al. |
| 2011/0222440 | A1 | 9/2011 | Phillips et al. |

OTHER PUBLICATIONS

U.S. Appl. No. 11/739,948, filed Apr. 25, 2007, Blocksome, et al.
U.S. Appl. No. 11/740,361, filed Apr. 26, 2007, Archer, et al.
U.S. Appl. No. 11/746,333, filed May 9, 2007, Archer, et al.
U.S. Appl. No. 11/754,765, filed May 29, 2007, Archer, et al.
U.S. Appl. No. 11/764,302, filed Jun. 18, 2007, Archer, et al.
U.S. Appl. No. 11/755,501, filed May 30, 2007, Archer, et al.
U.S. Appl. No. 11/829,325, filed Jul. 27, 2007, Archer, et al.
U.S. Appl. No. 11/829,334, filed Jul. 27, 2007, Archer, et al.
U.S. Appl. No. 11/776,718, filed Jul. 12, 2007, Blocksome.
U.S. Appl. No. 11/829,339, filed Jul. 27, 2007, Blocksome.
Watson, Robert, "DMA Controller Programming in C," C Users Journal, v11n11, Nov. 1993, p. 35-50.
Office Action Dated May 26, 2009 in U.S. Appl. No. 11/829,325.
Office Action Dated Aug. 27, 2009 in U.S. Appl. No. 11/739,948.
Office Action Dated Sep. 1, 2009 in U.S. Appl. No. 11/776,718.
Office Action Dated Sep. 18, 2009 in U.S. Appl. No. 11/829,334.
Office Action Dated Sep. 15, 2009 in U.S. Appl. No. 11/829,339.
Office Action Dated Nov. 24, 2009 in U.S. Appl. No. 11/829,325.
Office Action Dated Apr. 1, 2010 in U.S. Appl. No. 11/739,948.
Office Action Dated Feb. 5, 2010 in U.S. Appl. No. 11/746,333.
Office Action Dated Apr. 1, 2010 in U.S. Appl. No. 11/829,339.
Final Office Action Dated Mar. 8, 2010 in U.S. Appl. No. 11/829,334.
Final Office Action Dated Feb. 23, 2010 in U.S. Appl. No. 11/776,718.
Moreira, et al.; The Blue Gene/L Supercomputer: A Hardware and Software Story; International Journal of Parallel Programming; Jun. 2007; pp. 181-206; vol. 35, No. 3; Springer Science+Business Media, LLC; USA.
Office Action, U.S. Appl. No. 11/764,302, Jul. 28, 2010.
Office Action, U.S. Appl. No. 11/776,707, Jul. 14, 2010.
Notice of Allowance, U.S. Appl. No. 11/746,333, Jun. 23, 2010.
Notice of Allowance, U.S. Appl. No. 11/829,325, May 21, 2010.
Notice of Allowance, U.S. Appl. No. 11/739,948, Jul. 7, 2010.
Office Action, U.S. Appl. No. 11/740,361, Apr. 30, 2010.
RCE, U.S. Appl. No. 11/740,361, Jan. 30, 2012.
Notice of Allowance, U.S. Appl. No. 11/755,501, Jun. 9, 2011.
Final Office Action, U.S. Appl. No. 11/776,718, Mar. 30, 2012.
Ron Brightwell, Keith D. Underwood, "An Analysis of NIC Resource Usage for Offloading MPI," ipdps, vol. 9, pp. 183a, 18th International Parallel and Distributed Processing Symposium (IPDPS'04)—Workshop 8, 2004.
Keith D. Underwood, Ron Brightwell, "The Impact of MPI Queue Usage on Message Latency," icpp, pp. 152-160, 2004 International Conference on Parallel Processing (ICPP'04), 2004.
Keith D. Underwood, K. Scott Hemmert, Arun Rodrigues, Richard Murphy, Ron Brightwell, "A Hardware Acceleration Unit for MPI Queue Processing," ipdps, vol. 1, pp. 96b, 19th IEEE International Parallel and Distributed Processing Symposium (IPDPS'05)—Papers, 2005.
Watson, R., "DMA controller programming in C," C Users Journal, Nov. 1993, pp. 35-50 (10 Total Pages), v11 n11, R & D Publications, Inc., Lawrence, KS, USA. ISSN: 0898-9788.
Notice of Allowance, U.S. Appl. No. 12/702,661, May 15, 2013, pp. 1-9.
Notice of Allowance, U.S. Appl. No. 13/666,604, Sep. 25, 2013, pp. 1-10.
Office Action, U.S. Appl. No. 13/666,604, May 30, 2013, pp. 1-16.
Office Action, U.S. Appl. No. 13/676,700, Jun. 5, 2013, pp. 1-31.
Office Action, U.S. Appl. No. 13/671,055, Jul. 31, 2013, pp. 1-18.
Office Action, U.S. Appl. No. 13/769,715, Jul. 31, 2013, pp. 1-28.
Final Office Action, U.S. Appl. No. 11/740,361, Sep. 29, 2011.
Office Action, U.S. Appl. No. 11/776,718, Oct. 19, 2011.
Moreira, et al.; The Blue Gene/L Supercomputer: A Hardware and Software Story; International Journal Of Parallel Programming; Jun. 2007; pp. 181-206; vol. 35, No. 3, Springer Science+Business Media LLC.; USA.
Notice of Allowance, U.S. Appl. No. 11/754,719, Apr. 6, 2010.
Office Action, U.S. Appl. No. 11/744,319, May 12, 2010.
Office Action, U.S. Appl. No. 11/829,317, May 26, 2010.
Final Office Action, U.S. Appl. No. 11/746,348, Feb. 23, 2010.
Notice of Allowance, U.S. Appl. No. 11/758,167, Mar. 12, 2010.
Office Action, U.S. Appl. No. 11/754,719, Oct. 14, 2008.
Office Action, U.S. Appl. No. 11/754,719, Mar. 4, 2009.
Office Action, U.S. Appl. No. 11/758,167, Nov. 21, 2008.
Office Action, U.S. Appl. No. 11/744,296, Aug. 20, 2009.
Office Action, U.S. Appl. No. 11/746,348, Sep. 2, 2009.
Final Office Action, U.S. Appl. No. 11/758,167, Apr. 24, 2009.
Final Office Action, U.S. Appl. No. 11/754,719, Aug. 5, 2009.
Final Office Action, U.S. Appl. No. 11/744,296, Feb. 24, 2010.
Notice of Allowance, U.S. Appl. No. 11/746,348, Oct. 5, 2010.
Kumar et al., A Network on Chip Architecture and Design Methodology, IEEE Computer Society Annual Symposium on VLSI, 2002.

(56) References Cited

OTHER PUBLICATIONS

Final Office Action, U.S. Appl. No. 11/776,707, Jan. 6, 2011.
Final Office Action, U.S. Appl. No. 11/740,361, Oct. 4, 2010.
Office Action, U.S. Appl. No. 11/755,501, Nov. 26, 2010.
Office Action, U.S. Appl. No. 12/702,661, Dec. 14, 2012.
Office Action, U.S. Appl. No. 12/956,903, Mar. 19, 2013.

* cited by examiner

SELF-PACING DIRECT MEMORY ACCESS DATA TRANSFER OPERATIONS FOR COMPUTE NODES IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for self-pacing Direct Memory Access ('DMA') data transfer operations for compute nodes in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

When performing point to point message passing operations, a parallel application running on a compute node typically transmits a message to another compute node using messaging software installed on each compute node. Messaging software may partition the application message into multiple portions that the messaging software transfers one at a time from an origin compute node to a target compute node. In transferring the message portions, the messaging software may pace how often the messaging software transfers one of the message portions based on network congestion. In the current art, the messaging software on the origin node paces the data transfer operation by transferring a message portion to the target node, pinging the target node for a ping response, and waiting to transfer the next message portion until the origin compute node receives the ping response. Waiting to transfer the next message portion until the ping response is received paces the data transfer of each portion based on network congestion. Increased network congestion results in longer delays between the transfer of each message portion, while decreased network congestion results in shorter delays between the transfer of each message portion. The drawback to the current art, however, is that each time the origin node pings the target node, a processing core on the origin compute node is diverted from other processing tasks to perform the ping and a processing core on the target node is interrupted from other processing tasks to process the ping request from the origin compute node. Using the processing cores in these ping operations is often a computationally expensive operation and typically decreases origin node and target node performance. As such, readers will appreciate that room for improvement exists in pacing a data transfer between compute nodes on a parallel computer.

SUMMARY OF THE INVENTION

Methods, apparatus, and products are disclosed for self-pacing Direct Memory Access ('DMA') data transfer operations for compute nodes in a parallel computer that include: transferring, by an origin DMA engine on an origin compute node, a request to send ('RTS') message to a target compute node, the RTS message specifying an application message on the origin compute node for transfer to the target compute node; receiving, in an origin injection first-in-first-out ('FIFO') buffer for the origin DMA engine from a target DMA engine on the target compute node in response to transferring the RTS message, a target RGET data descriptor followed by a DMA transfer operation data descriptor, the DMA transfer operation data descriptor specifying a DMA data transfer operation for transmitting a portion of the application message to the target compute node, the target RGET data descriptor specifying an origin RGET data descriptor on the origin compute node, the origin RGET data descriptor specifying an additional DMA transfer operation data descriptor that specifies an additional DMA data transfer operation for transmitting an additional portion of the application message to the target compute node; processing, by the origin DMA engine, the target RGET data descriptor, including transferring the origin RGET data descriptor to the target DMA engine for injection into a target injection FIFO buffer for the target DMA engine; and processing, by the origin DMA engine, the DMA transfer operation data descriptor, including transferring the portion of the application message specified by the DMA transfer operation data descriptor to the target compute node.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
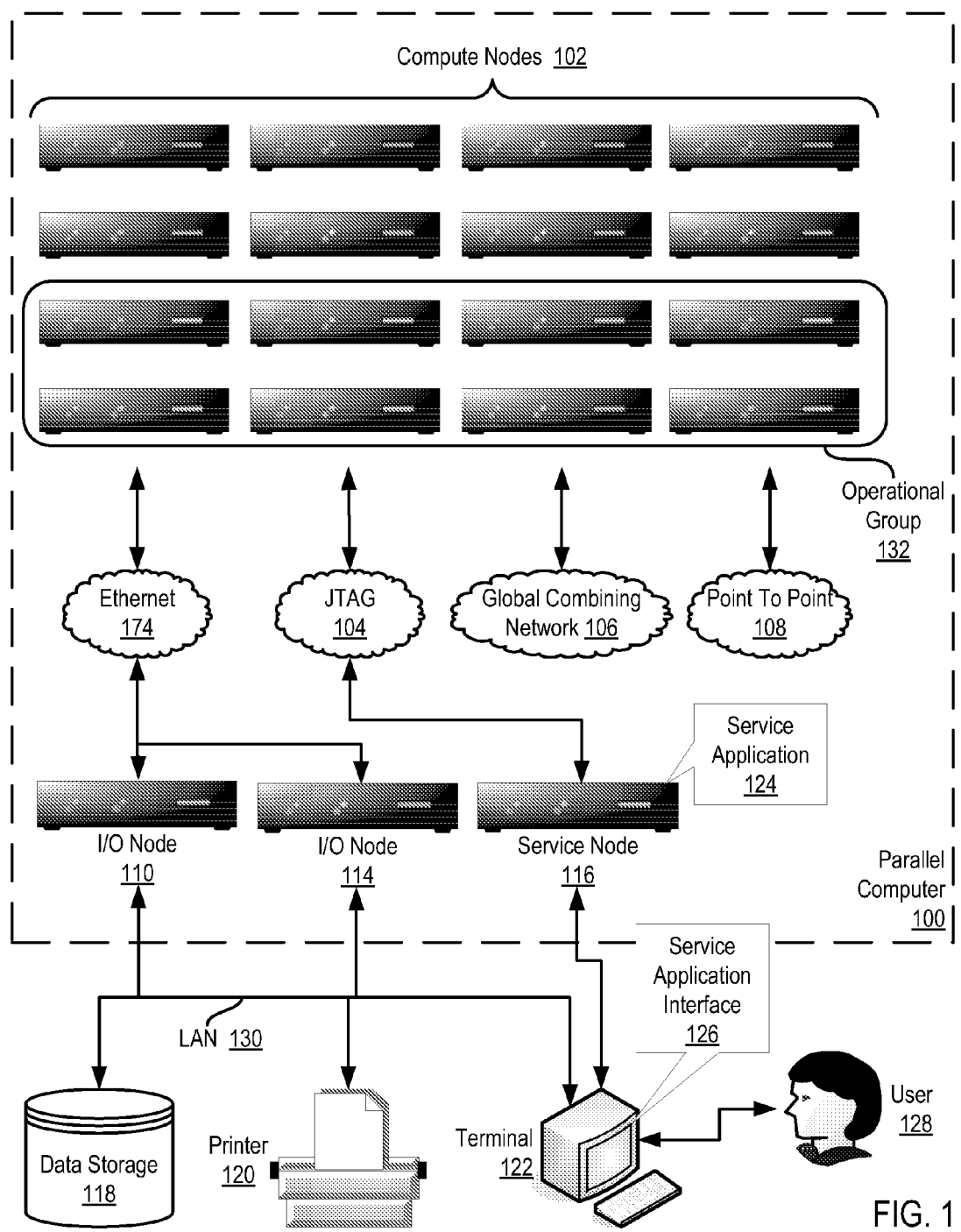
FIG. 1 illustrates an exemplary system for self-pacing DMA data transfer operations for compute nodes in a parallel computer according to embodiments of the present invention.

Exemplary methods, apparatus, and computer program products for self-pacing DMA data transfer operations for compute nodes in a parallel computer according to embodiments of the present invention are described with reference to the accompanying drawings, beginning with FIG. 1. FIG. 1 illustrates an exemplary system for self-pacing DMA data transfer operations for compute nodes in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount * N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for self-pacing DMA data transfer operations for compute nodes in a parallel computer according to embodiments of the present invention. The system of FIG. 1 operates generally for self-pacing DMA data transfer operations for compute nodes in a parallel computer according to embodiments of the present invention as follows: An origin DMA engine on an origin compute node transfers a request to send ('RTS') message to a target compute node. The RTS message specifies an application message on the origin compute node for transfer to the target compute node. In response to transferring the RTS message, the origin DMA engine receives, in an origin injection first-in-first-out ('FIFO') buffer for the origin DMA engine from a target DMA engine on the target compute node, a target RGET data descriptor followed by a DMA transfer operation data descriptor. The DMA transfer operation data descriptor specifies a DMA data transfer operation for transmitting a portion of the application message to the target compute node. The target RGET data descriptor specifies an origin RGET data descriptor on the origin compute node. The origin RGET data descriptor specifies an additional DMA transfer operation data descriptor on the target compute node that specifies an additional DMA data transfer operation for transmitting an additional portion of the application message to the target compute node. The origin DMA engine processes the target RGET data descriptor, including transferring the origin RGET data descriptor to the target DMA engine for injection into a target injection FIFO buffer for the target DMA engine. The origin DMA engine processes the DMA transfer operation data descriptor, including transferring the portion of the application message specified by the DMA transfer operation data descriptor to the target compute node. In response to transferring the origin RGET data descriptor to the target DMA engine, the origin DMA engine may also receive, in the origin injection FIFO buffer, the additional DMA transfer operation data descriptor from the target DMA engine. The origin DMA engine may then process the additional DMA transfer operation data descriptor, including transferring the additional portion of the application message specified by the additional DMA transfer operation data descriptor to the target compute node. Readers will note that the origin compute node is a compute node attempting to transmit an application message to another compute node and that the target compute node is the compute node specified by the origin compute node as the recipient of the application message.

A RTS message is a control message used by an origin compute node to provide a target compute node with information describing an application message for transfer.

A RTS message may, for example, describe a memory location in which the message is stored, a size of the application message, a DMA counter used to track when the message transfer is complete, and so on. In addition, a RTS message may also provide the target compute node with other information used to setup the data transfer of the message from the origin node to the target node as will occur to those of skill in the art.

A data descriptor is a data structure that specifies a particular DMA data transfer to be carried out by a DMA engine. A data descriptor may specify the type of DMA transfer operation used to transfer data between compute nodes such as, for example, a direct put data transfer operation or a memory FIFO data transfer operation. A data descriptor may also specify the packet headers for the packets used to transmit the data through a network.

A direct put operation is a mode of transferring data using DMA engines, typically a DMA engine on an origin node and a DMA engine on a target node. A direct put operation allows data to be transferred and stored to a particular compute node with little or no involvement from the compute node's processor. To effect minimal involvement from the compute node's processor in the direct put operation, the DMA engine of the sending compute node transfers the data to the DMA engine on the receiving compute node along with a specific identification of a storage location on the receiving compute node. The DMA engine on the receiving compute node then stores the data in the storage location specified by the sending compute node's DMA engine. The sending compute node's DMA engine is aware of the specific storage location on the receiving compute node because the specific storage location for storing the data on the receiving compute node has been previously provided to the DMA engine of the sending compute node.

A memory FIFO data transfer operation is a mode of transferring data using DMA engines, typically a DMA engine on an origin node and a DMA engine on a target node. In a memory FIFO data transfer operation, data is transferred along with a data descriptor describing the data from one DMA engine to another DMA engine. The DMA engine receiving the data and its descriptor in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

As mentioned above, the origin compute node and the target compute node use RGET packets to pass data descriptors between the compute nodes. An RGET packet is created by a DMA engine upon processing a data descriptor that specifies a remote get operation. A remote get operation is a DMA control operation that allows a compute node to retrieve data from another compute node without involving the processor on the compute node providing the data by injecting a data descriptor into the other computer node's DMA FIFO buffers.

The arrangement of nodes, networks, and I/O devices making up the exemplary system illustrated in FIG. 1 are for explanation only, not for limitation of the present invention. Data processing systems capable of self-pacing DMA data transfer operations for compute nodes in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of self-pacing DMA data transfer operations for compute nodes in a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Self-pacing DMA data transfer operations for compute nodes in a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of self-pacing DMA data transfer operations for compute nodes according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
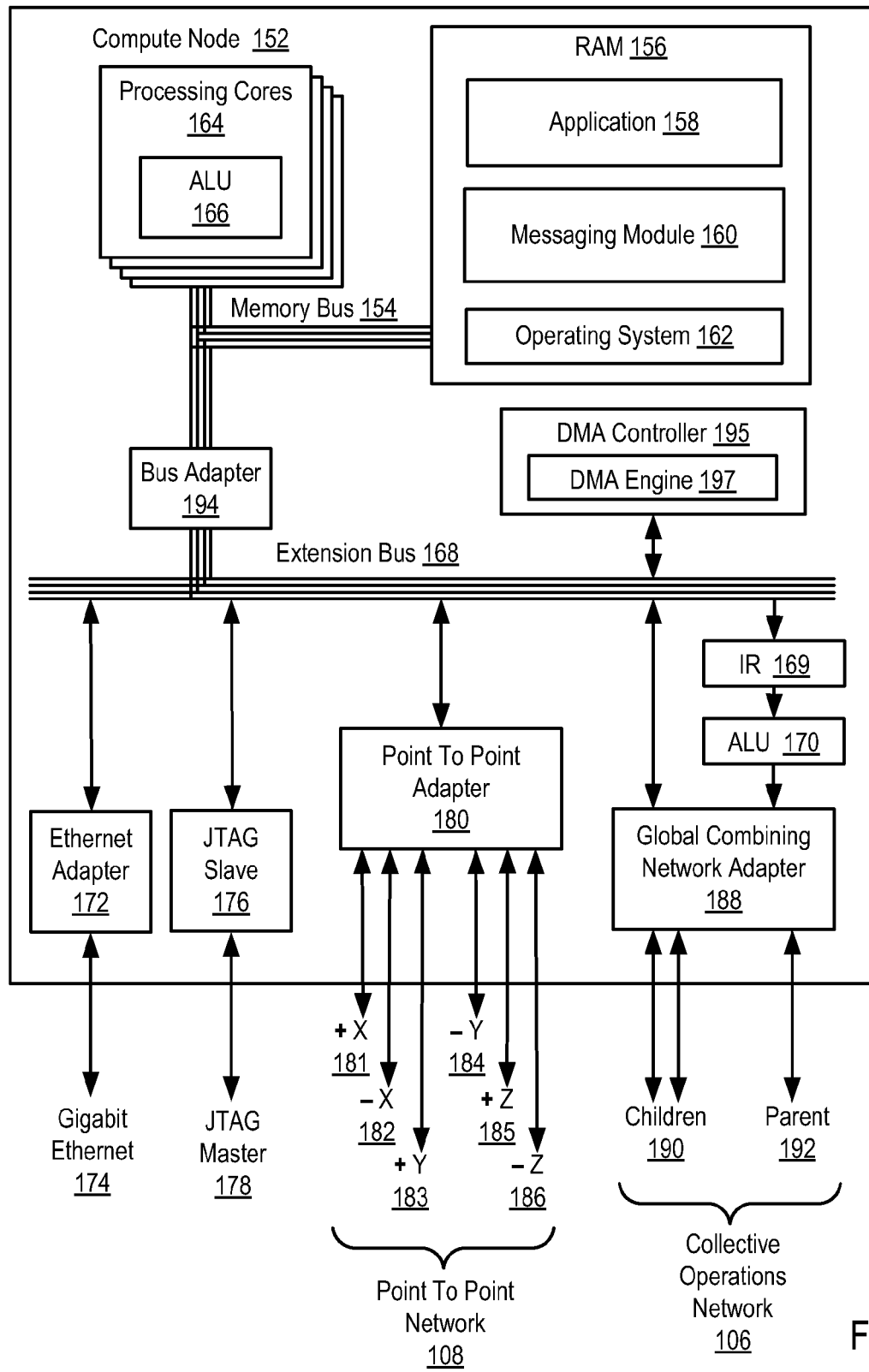
FIG. 2 sets forth a block diagram of an exemplary compute node useful in a parallel computer capable of self-pacing DMA data transfer operations for compute nodes according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for self-pacing DMA data transfer operations for compute nodes in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system.

The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in self-pacing DMA data transfer operations for compute nodes in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

The DMA engine (197) of FIG. 2 is improved for self-pacing DMA data transfer operations for compute nodes in a parallel computer according to embodiments of the present invention. The DMA engine (197) of FIG. 2 operates generally for self-pacing DMA data transfer operations for compute nodes in a parallel computer according to embodiments of the present invention by: transferring a RTS message to a target compute node, the RTS message specifying an application message on the origin compute node for transfer to the target compute node; receiving, in an origin injection first-in-first-out ('FIFO') buffer for the origin DMA engine from a target DMA engine on the target compute node in response to transferring the RTS message, a target RGET data descriptor followed by a DMA transfer operation data descriptor, the DMA transfer operation data descriptor specifying a DMA data transfer operation for transmitting a portion of the application message to the target compute node, the target RGET data descriptor specifying an origin RGET data descriptor on the origin compute node, the origin RGET data descriptor specifying an additional DMA transfer operation data descriptor that specifies an additional DMA data transfer operation for transmitting an additional portion of the application message to the target compute node; processing the target RGET data descriptor, including transferring the origin RGET data descriptor to the target DMA engine for injection into a target injection FIFO buffer for the target DMA engine; and processing the DMA transfer operation data descriptor, including transferring the portion of the application message specified by the DMA transfer operation data descriptor to the target compute node. The DMA engine (197) of FIG. 2 may also operate generally for self-pacing DMA data transfer operations for compute nodes in a parallel computer according to embodiments of the present invention by: receiving, in the origin injection FIFO buffer from the target DMA engine in response to transferring the origin RGET data descriptor to the target DMA engine, the additional DMA transfer operation data descriptor; and processing the additional DMA transfer operation data descriptor, including transferring the additional portion of the application message specified by the additional DMA transfer operation data descriptor to the target compute node.

Figure 3A:
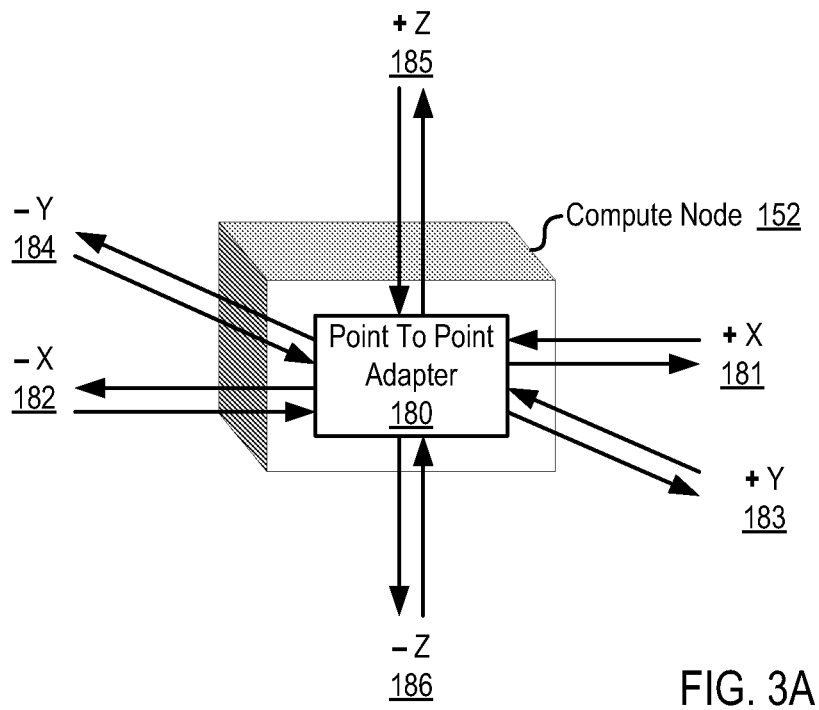
FIG. 3A illustrates an exemplary Point To Point Adapter useful in systems capable of self-pacing DMA data transfer operations for compute nodes in a parallel computer according to embodiments of the present invention.

For further explanation, FIG. 3A illustrates an exemplary Point To Point Adapter (180) useful in systems capable of self-pacing DMA data transfer operations for compute nodes in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
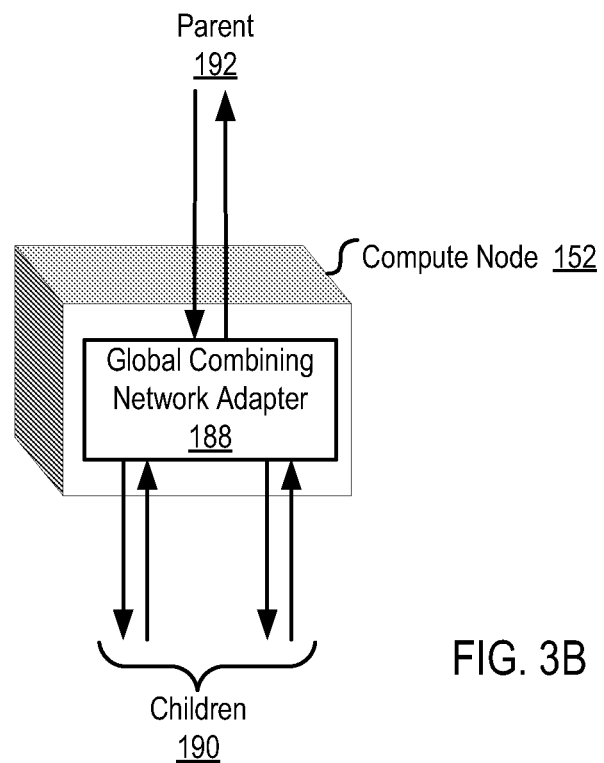
FIG. 3B illustrates an exemplary Global Combining Network Adapter useful in systems capable of self-pacing DMA data transfer operations for compute nodes in a parallel computer according to embodiments of the present invention.

For further explanation, FIG. 3B illustrates an exemplary Global Combining Network Adapter (188) useful in systems capable of self-pacing DMA data transfer operations for compute nodes in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
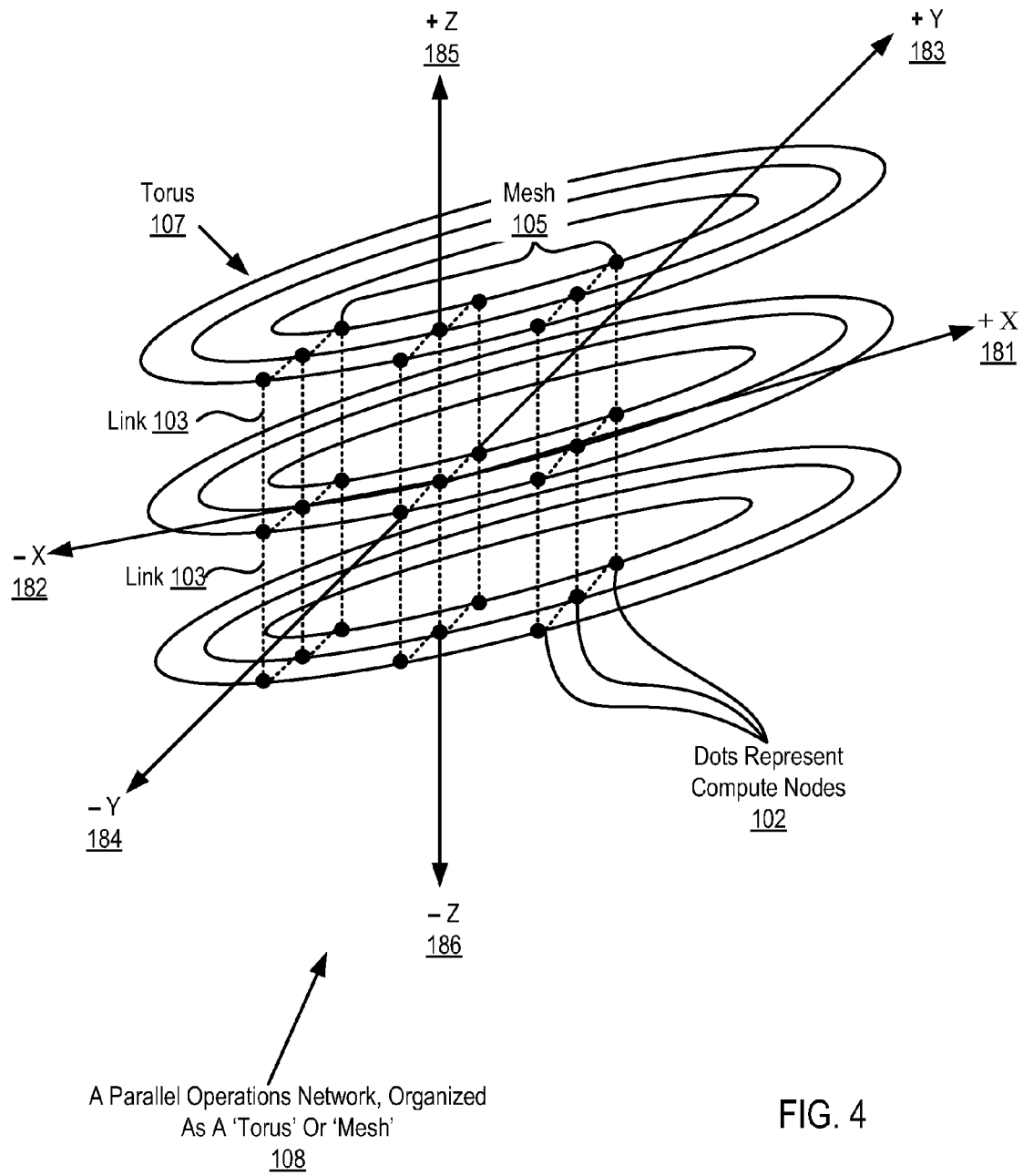
FIG. 4 sets forth a line drawing illustrating an exemplary data communications network optimized for point to point operations useful in systems capable of self-pacing DMA data transfer operations for compute nodes in a parallel computer in accordance with embodiments of the present invention.

For further explanation, FIG. 4 sets forth a line drawing illustrating an exemplary data communications network (108) optimized for point to point operations useful in systems capable of self-pacing DMA data transfer operations for compute nodes in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in self-pacing DMA data transfer operations for compute nodes in a parallel computer in accordance with embodiments of the present invention may contain only a few compute nodes or may contain thousands of compute nodes.

Figure 5:
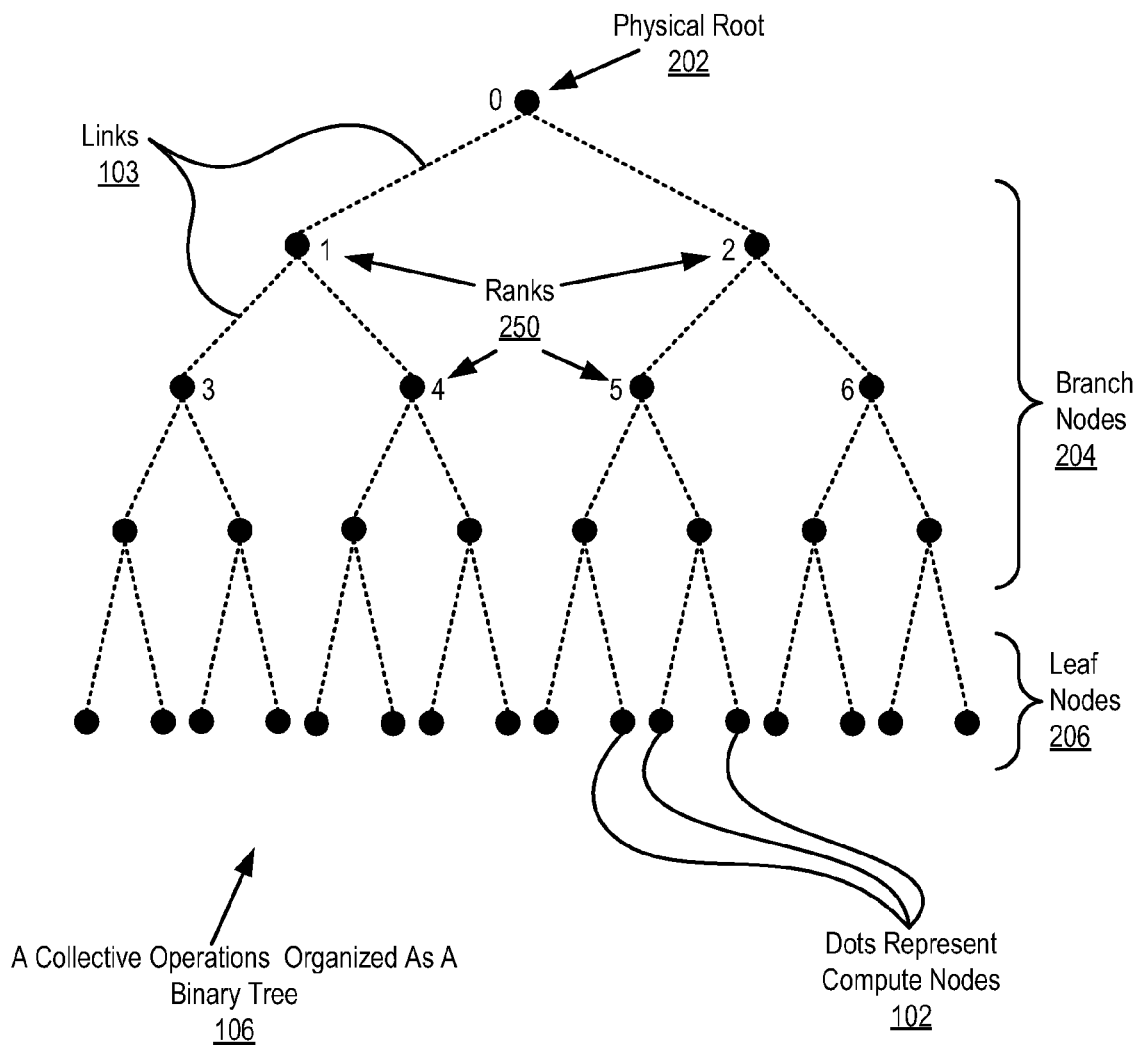
FIG. 5 sets forth a line drawing illustrating an exemplary data communications network optimized for collective operations useful in systems capable of self-pacing DMA data transfer operations for compute nodes in a parallel computer in accordance with embodiments of the present invention.

For further explanation, FIG. 5 sets forth a line drawing illustrating an exemplary data communications network (106) optimized for collective operations useful in systems capable of self-pacing DMA data transfer operations for compute nodes in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for self-pacing DMA data transfer operations for compute nodes in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
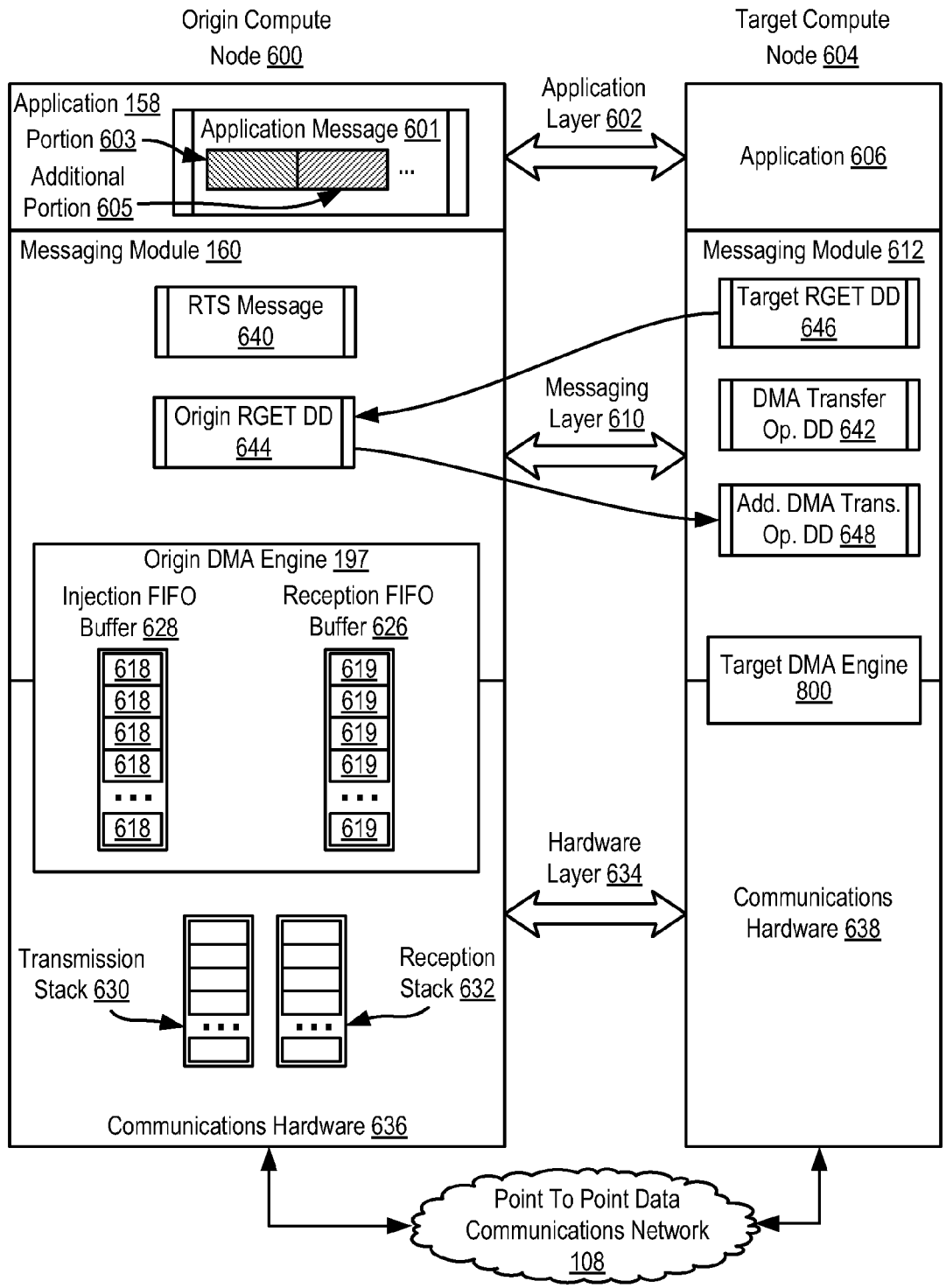
FIG. 6 sets forth a block diagram illustrating an exemplary communications architecture illustrated as a protocol stack useful in self-pacing DMA data transfer operations for compute nodes in a parallel computer according to embodiments of the present invention.

For further explanation, FIG. 6 sets forth a block diagram illustrating an exemplary communications architecture illustrated as a protocol stack useful in self-pacing DMA data transfer operations for compute nodes in a parallel computer according to embodiments of the present invention. The exemplary communications architecture of FIG. 6 sets forth two compute nodes, an origin compute node (600) and a target compute node (604). Only two compute nodes are illustrated in the example of FIG. 6 for ease of explanation and not for limitation. In fact, self-pacing DMA data transfer operations for compute nodes in a parallel computer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the applications (158, 606) typically communicate by passing messages. Data communications between applications (158, 606) are effected using messaging modules (160, 612) installed on each of the compute nodes (600, 604). Applications (158, 606) may communicate by invoking function of an application programming interfaces ('API') exposed by the application messaging modules (606, 612). For the application (158) to transmit an application message to the application (606), the application (158) of FIG. 6 may invoke a function of an API for messaging module (160) that passes a buffer identifier of an application buffer containing the application message to the messaging module (160).

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin compute node (600) and messaging module (612) installed on the target compute node (604).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes a transmission stack (630) for storing network packets for transmission to other communications hardware through the data communications network (108) and includes a reception stack (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in self-pacing DMA data transfer operations for compute nodes in a parallel computer according to embodiments of the present invention may often provide messaging layer interfaces and also implement communications according to some aspects of the communication hardware layer (634). The exemplary DMA engine (197) of FIG. 6 includes an injection first-in-first-out ('FIFO') buffer (628) for storing data descriptors (618) that specify DMA transfer operations for transferring data. The exemplary DMA engine (197) of FIG. 6 also includes a reception FIFO buffer (626) used to receive network packets (619) from other DMA engines on other compute nodes. Although FIG. 6 only illustrates a single injection FIFO buffer (628) and a single reception FIFO buffer (626), readers will note that a DMA engine may have access to any number of injection FIFO buffers and reception FIFO buffers.

The origin DMA engine (197) of FIG. 6 is improved for self-pacing DMA data transfer operations for compute nodes in a parallel computer according to embodiments of the present invention. The origin DMA engine (197) of FIG. 6 operates generally for self-pacing DMA data transfer operations for compute nodes in a parallel computer according to embodiments of the present invention by: transferring a request to send ('RTS') message (640) to a target compute node, the RTS message (640) specifying an application message (601) on the origin compute node (600) for transfer to the target compute node (604); receiving, in an origin injection first-in-first-out ('FIFO') buffer (628) from a target DMA engine (800) on the target compute node (604) in response to transferring the RTS message (640), a target RGET data descriptor (646) followed by a DMA transfer operation data descriptor (642), the DMA transfer operation data descriptor (642) specifying a DMA data transfer operation for transmitting a portion (603) of the application message (601) to the target compute node, the target RGET data descriptor (646) specifying an origin RGET data descriptor (644) on the origin compute node (600), the origin RGET data descriptor (644) specifying an additional DMA transfer operation data descriptor (648) that specifies an additional DMA data transfer operation for transmitting an additional portion (605) of the application message (601) to the target compute node; processing the target RGET data descriptor (646), including transferring the origin RGET data descriptor (644) to the target DMA engine for injection into a target injection FIFO buffer for the target DMA engine; and processing the DMA transfer operation data descriptor (642), including transferring the portion (603) of the application message (601) specified by the DMA transfer operation data descriptor (642) to the target compute node. The origin DMA engine (197) of FIG. 6 may also operates generally for self-pacing DMA data transfer operations for compute nodes in a parallel computer according to embodiments of the present invention by: receiving, in the origin injection FIFO buffer (628) from the target DMA engine (800) in response to transferring the origin RGET data descriptor (644) to the target DMA engine (800), the additional DMA transfer operation data descriptor (648); and processing the additional DMA transfer operation data descriptor (648), including transferring the additional portion (605) of the application message (601) specified by the additional DMA transfer operation data descriptor (648) to the target compute node (604).

The target DMA engine (197) of FIG. 6 may also be improved for self-pacing DMA data transfer operations for compute nodes in a parallel computer according to embodiments of the present invention. The target DMA engine (197) of FIG. 6 operates generally for self-pacing DMA data transfer operations for compute nodes in a parallel computer according to embodiments of the present invention by: receiving the RTS message (640) from the origin DMA engine (197); and transferring, to the origin DMA engine (197) for processing, the target RGET data descriptor (646) and the DMA transfer operation data descriptor (642). The target DMA engine (197) of FIG. 6 may also operates generally for self-pacing DMA data transfer operations for compute nodes in a parallel computer according to embodiments of the present invention by: receiving the origin RGET data descriptor (644) from the origin DMA engine (197); and transferring, to the origin DMA engine (197) for processing, the additional DMA transfer operation data descriptor (648).

Readers will note that the RGET data descriptors (644, 646) are used to link data descriptors on both the origin and target nodes so as to self-pace DMA data transfer operations specified by the DMA transfer operation data descriptors (642, 648). As mentioned above, the target RGET data descriptor (646) specifies the origin RGET data descriptor (644), and the origin RGET data descriptor (644) specifies the additional DMA transfer operation data descriptor (648). Upon receiving the RTS message (640), the target DMA engine (800) injects the target RGET data descriptor (646) and the DMA transfer operation data descriptor (644) in the origin injection FIFO buffer (628) using a remote get operation.

Upon receiving the data descriptors (646, 644), the origin DMA engine (197) processes each descriptor (646, 644). When the origin DMA engine (197) processes the DMA transfer operation data descriptor (642), the origin DMA engine (197) transfers a portion (603) of the application message (601) to the target compute node (604). Because the target RGET data descriptor (646) specifies the origin RGET data descriptor (644), when the origin DMA engine (197) processes the target RGET data descriptor (646), the origin DMA engine (197) injects the origin RGET data descriptor (644) in a target injection FIFO buffer for the target DMA engine (800) using a remote get operation. Because the origin RGET data descriptor (644) specifies the additional DMA transfer operation data descriptor (648), when the target DMA engine (800) processes the origin RGET data descriptor (644), the target DMA engine (800) injects the additional DMA transfer operation data descriptor (648) in the origin injection FIFO buffer (628) for the origin DMA engine (197) using a remote get operation. When the origin DMA engine (197) processes the additional DMA transfer operation data descriptor (648), the origin DMA engine (197) transfers an additional portion (605) of the application message (601) to the target compute node (604).

Readers will note that although only two DMA transfer operations are linked together in the example of FIG. 6, any number of DMA transfer operations may be linked together in self-pacing DMA data transfer operations for compute nodes in a parallel computer according to embodiments of the present invention. The number of additional DMA transfer operation linked together may be increased by adding an additional DMA transfer operation data descriptor on the target compute node (604) for each additional DMA transfer operation. For each additional DMA transfer operation data descriptor, an additional origin RGET data descriptor is typically added to the origin compute node (600), and an additional target RGET data descriptor is typically added to the target compute node (604). The additional origin RGET data descriptor specifies the additional DMA transfer operation data descriptor, and the additional target RGET data descriptor that specifies the additional origin RGET data descriptor. To link the additional target RGET data descriptor with previous origin RGET data descriptor, the previous origin RGET data descriptor on the origin node is typically configured to specify the previous DMA transfer operation data descriptor and the additional target RGET data descriptor on the target node. For example, to add an additional DMA transfer operation to the linked DMA transfer operations in the example of FIG. 6, the origin RGET data descriptor (644) would be configured to specify an additional target RGET data descriptor on the target node along with the DMA transfer operation data descriptor (648). That additional target RGET data descriptor would be configured to specify an additional origin RGET data descriptor on the origin node, which in turn, would be configured to specify an additional DMA transfer operation data descriptor for the additional DMA transfer operation to be linked to the DMA transfer operations in the example of FIG. 6.

Figure 7:
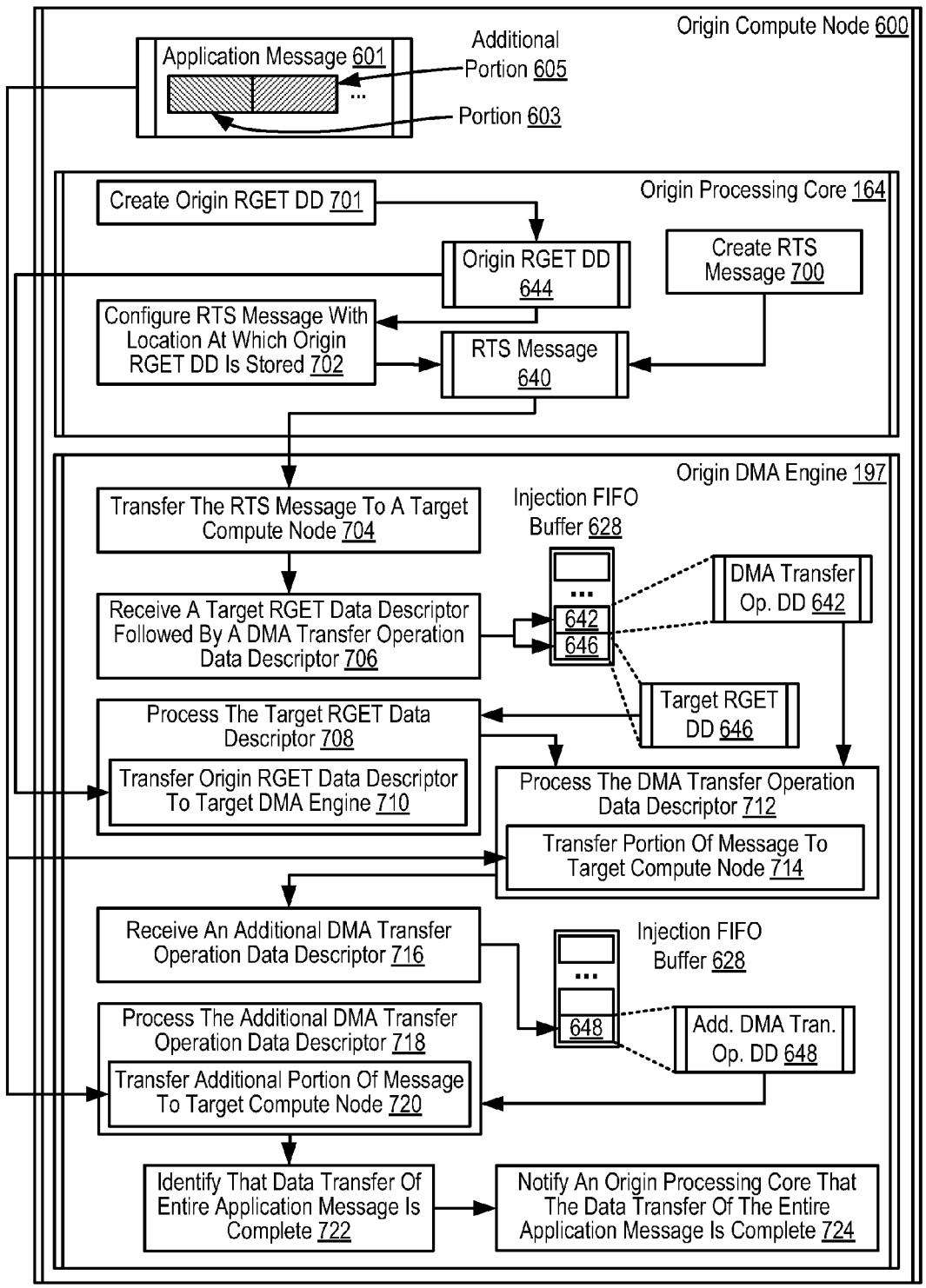
FIG. 7 sets forth a flow chart illustrating an exemplary method for self-pacing DMA data transfer operations for compute nodes in a parallel computer according to the present invention.

For further explanation, FIG. 7 sets forth a flow chart illustrating an exemplary method for self-pacing DMA data transfer operations for compute nodes in a parallel computer according to the present invention. The method of FIG. 7 includes creating (700), by an origin processing core (164) on an origin compute node (600), a request to send ('RTS') message (640). The RTS message (640) specifies an application message (601) on the origin compute node (600) for transfer to a target compute node. The RTS message (640) is a control message used by an origin compute node (600) to provide a target compute node with information describing the application message (601) for transfer. The RTS message (640) may, for example, describe a memory location in which the message (601) is stored, a size of the application message (601), a DMA counter used to track when the message transfer is complete, and so on. In addition, a RTS message (640) may also provide the target compute node with other information used to setup the data transfer of the message (601) from the origin node (600) to the target node as will occur to those of skill in the art. Using the RTS message (640), a target compute node may generate DMA transfer operation data descriptors for transferring various portions (603, 605) of the message (601) to the target compute node using a remote get operation. In response to receiving the RTS message (640), the target compute node begins processing the chain of DMA transfer operation data descriptors that transfer the portions of the message (601) to the target compute node.

The method of FIG. 7 also includes creating (701), by an origin processing core (164) on the origin compute node (600), the origin RGET data descriptor (644). The origin RGET data descriptor (644) is a data descriptor on the origin compute node (600) that instructs the target compute node to process the next DMA transfer operation data descriptor in the chain of DMA transfer operation data descriptors used to transfer the portions of the message (601) to the target compute node. In the example of FIG. 7, the origin RGET data descriptor (644) specifies an additional DMA transfer operation data descriptor (648), which in turn, specifies an additional DMA data transfer operation for transmitting an additional portion (605) of the application message (601) to the target compute node. To transfer the origin RGET data descriptor (648) to the target compute node, the target compute node creates a target RGET data descriptor (646) that specifies transferring the origin RGET data descriptor (644) to the target compute node using a remote get operation.

In order for a target compute node to create a target RGET data descriptor (646) that specifies the origin RGET data descriptor (644), the origin compute node provides the target compute node with the location in computer memory on the origin compute node (600) at which the origin RGET data descriptor (644) is stored using the RTS message (640). The method of FIG. 7 therefore includes configuring (702), by the origin processing core (164), the RTS message (640) with a location in computer memory on the origin compute node (600) at which the origin RGET data descriptor (644) is stored. The origin processing core (164) may configure (702) the RTS message (640) with the location in computer memory on the origin compute node (600) at which the origin RGET data descriptor (644) is stored according to the method of FIG. 7 by identifying the address in memory at which the origin RGET data descriptor (644) begins and the size of the origin RGET data descriptor (644) and storing the address and size in the RTS message (640).

The method of FIG. 7 includes transferring (704), by an origin DMA engine (197) on an origin compute node (600), a request to send ('RTS') message (640) to a target compute node. As mentioned above, the RTS message (640) of FIG. 7 specifies an application message (601) on the origin compute node (600) for transfer to a target compute node, including the location in computer memory on the origin compute node (600) at which the origin RGET data descriptor (644) is stored. The origin DMA engine (197) may transfer (704) the RTS message (640) to a target compute node according to the method of FIG. 7 by packetizing the RTS message (640) and injecting the packets into a transmission stack for the origin node's network adapter for transmission to the target compute node.

When the origin DMA engine (197) transfers the RTS message (640) to the target compute node, the target compute node performs some initial setup operations to enable the DMA engines to self-pace the data transfer of the application message (601) without further intervention of the processing cores on the compute nodes. The target compute node typically creates a set of data descriptors used to carry out self-pacing DMA data transfer operations according to embodiments of the present invention using the data contained in the RTS message (640). As discussed in more detail below, the target compute node may create a DMA transfer operation data descriptor (642) and the additional DMA transfer operation data descriptor (648) used to transfer portions (603, 605) of the message (601) to the target compute node. The DMA transfer operation data descriptor (642) specifies a DMA data transfer operation for transmitting a portion (603) of the application message (601) to the target compute node, and the additional DMA transfer operation data descriptor (648) specifies a DMA data transfer operation for transmitting an additional portion (605) of the application message (601) to the target compute node. After creating the DMA transfer operation data descriptors (642, 648), the target compute node provides the DMA transfer operation data descriptor (642) and the target RGET data descriptor (646) to the origin compute node (600) for processing.

The method of FIG. 7 includes receiving (706), in an origin injection FIFO buffer (628) from a target DMA engine on the target compute node in response to transferring (704) the RTS message (640), a target RGET data descriptor (646) followed by a DMA transfer operation data descriptor (642). The origin DMA engine (197) may receive (706) the target RGET data descriptor (646) followed by the DMA transfer operation data descriptor (642) in the origin injection FIFO buffer (628) from a target DMA engine on the target compute node according to the method of FIG. 7 by retrieving a RGET packet from the reception stack for a network adapter of the origin compute node (600), unencapsulating the target RGET data descriptor (646) and the DMA transfer operation data descriptor (642) from the RGET packet, and injecting the target RGET data descriptor (646) followed by the DMA transfer operation data descriptor (642) in the origin injection FIFO buffer (628) for processing.

The method of FIG. 7 also includes processing (708), by the origin DMA engine (197), the target RGET data descriptor (646). As mentioned above, the target RGET data descriptor (646) specifies the origin RGET data descriptor (644) on the origin compute node (600). The origin DMA engine (197) may process (708) the target RGET data descriptor (646) according to the method of FIG. 7 by retrieving the origin RGET data descriptor (644) from the location in computer memory specified by the target RGET data descriptor (646) and creating a RGET packet having the origin RGET data descriptor (644) as its payload and a packet header as specified by the target RGET data descriptor (646).

Processing (708), by the origin DMA engine (197), the target RGET data descriptor (646) according to the method of FIG. 7 includes transferring (710) the origin RGET data descriptor (644) to the target DMA engine for injection into a target injection FIFO buffer for the target DMA engine. The origin DMA engine (197) may transfer (710) the origin RGET data descriptor (644) to the target DMA engine for injection into a target injection FIFO buffer for the target DMA engine according to the method of FIG. 7 by injecting the RGET packet having the origin RGET data descriptor (644) as its payload into the transmission stack of the origin node's network adapter for transmission to the target compute node.

The method of FIG. 7 also includes processing (712), by the origin DMA engine (197), the DMA transfer operation data descriptor (642). The origin DMA engine (197) may process (712) the DMA transfer operation data descriptor (642) according to the method of FIG. 7 by retrieving the portion (603) of the application message (601) specified by the DMA transfer operation data descriptor (642), packetizing the portion (603) into network packets having a packet header as specified by the DMA transfer operation data descriptor (642). The DMA data transfer operation used to transfer the message portion (603) to the target compute node may be implemented as a memory FIFO transfer operation or a direct put operation. The DMA data transfer operation is typically specified in the packet header specified by the DMA transfer operation data descriptor (642).

Processing (712), by the origin DMA engine (197), the DMA transfer operation data descriptor (642) according to the method of FIG. 7 includes transferring (714) the portion (603) of the application message (601) specified by the DMA transfer operation data descriptor (642) to the target compute node. The origin DMA engine (197) may transfer (714) the portion (603) of the application message (601) according to the method of FIG. 7 by injecting the network packets encapsulating the message portion (603) into the transmission stack of the origin node's network adapter for transmission to the target compute node.

As mentioned above, the target compute node provided the DMA data transfer operation data descriptor (642) to the origin DMA engine (197) to instruct the origin DMA engine (197) to transfer the portion (603) of the message (601) to the target compute node. To ensure that the additional DMA transfer operation data descriptor (648) is processed after the DMA transfer operation data descriptor (642) without invoking any processing core, the target compute node also created a target RGET data descriptor (646) that instructs the origin DMA engine (197) to transfer the origin RGET data descriptor (644) to the target DMA engine. The origin RGET data descriptor (644), in turn, instructs the target DMA engine to transfer the additional DMA transfer operation data descriptor (648) to the origin compute node (600).

In the method of FIG. 7, readers will note that the origin DMA engine (197) receives the target RGET data descriptor (646) followed by the DMA transfer operation data descriptor (642). Receiving the target RGET data descriptor (646) followed by the DMA transfer operation data descriptor (642) allows the origin DMA engine (197) to process the target RGET data descriptor (646) before the DMA transfer operation data descriptor (642). In such a manner, the origin DMA engine (197) may instruct the target DMA engine to transfer the additional DMA transfer operation data descriptor (648) to the origin compute node (600) using the origin RGET data descriptor (644) while the origin DMA engine (197) processes the first DMA transfer operation data descriptor (642).

The method of FIG. 7 also includes receiving (716), in the origin injection FIFO buffer (628) by the origin DMA engine (197) from the target DMA engine in response to transferring (710) the origin RGET data descriptor (644) to the target DMA engine, the additional DMA transfer operation data descriptor (648). The origin DMA engine (197) receives (716), in the origin injection FIFO buffer (628) from the target DMA engine, the additional DMA transfer operation data descriptor (648) according to the method of FIG. 7 by retrieving a RGET packet from the reception stack for a network adapter of the origin compute node (600), unencapsulating the additional DMA transfer operation data descriptor (648) from the RGET packet, and injecting the additional DMA transfer operation data descriptor (648) in the origin injection FIFO buffer (628) for processing.

The method of FIG. 7 includes processing (718), by the origin DMA engine (197), the additional DMA transfer operation data descriptor (648). The origin DMA engine (197) processes (718) the additional DMA transfer operation data descriptor (648) according to the method of FIG. 7 by retrieving the additional portion (605) of the application message (601) specified by the additional DMA transfer operation data descriptor (648), packetizing the additional portion (605) into network packets having a packet header as specified by the additional DMA transfer operation data descriptor (648). The DMA data transfer operation used to transfer the additional message portion (605) to the target compute node may be implemented as a memory FIFO transfer operation or a direct put operation. The DMA data transfer operation is typically specified in the packet header specified by the additional DMA transfer operation data descriptor (648).

Processing (718), by the origin DMA engine (197), the additional DMA transfer operation data descriptor (648) according to the method of FIG. 7 includes transferring (720) the additional portion (605) of the application message (601) specified by the additional DMA transfer operation data descriptor (648) to the target compute node. The origin DMA engine (197) may transfer (720) the additional message portion (605) specified by the additional DMA transfer operation data descriptor (648) to the target compute node according to the method of FIG. 7 by injecting the network packets encapsulating the message portion (605) into the transmission stack of the origin node's network adapter for transmission to the target compute node.

The method of FIG. 7 also includes identifying (722), by the origin DMA engine (197), that the data transfer of the entire application message (601) is complete. The origin DMA engine (197) may identify (722) that the data transfer of the entire application message (601) is complete according to the method of FIG. 7 by identifying whether the target DMA engine transferred a local memory FIFO data descriptor to the origin DMA engine (197) for injection into the origin injection FIFO buffer (628). If the target DMA engine transfers a local memory FIFO data descriptor to the origin DMA engine (197) for injection into the origin injection FIFO buffer (628), then the data transfer of the entire application message (601) is complete. The data transfer of the entire application message (601) is not complete, however, if the target DMA engine does not transfer a local memory FIFO data descriptor to the origin DMA engine (197) for injection into the origin injection FIFO buffer (628).

The method of FIG. 7 includes notifying (724), by the origin DMA engine (197), the origin processing core (164) on the origin compute node (600) that the data transfer of the entire application message (601) is complete. The origin DMA engine (197) may notify (724) that the data transfer of the entire application message (601) is complete according to the method of FIG. 7 by injecting a local memory FIFO data descriptor received from the target DMA engine into the injection FIFO buffer (628), creating a local memory FIFO packet in dependence upon the local memory FIFO data descriptor, and injecting the local memory FIFO packet into the reception FIFO buffer for the origin DMA engine (197). The reception FIFO buffer for the origin DMA engine (197) may be configured such that an interrupt is triggered upon the injection of any packet in the injection FIFO buffer, thereby notifying the origin processing core (164) that the data transfer of the entire application message (601) is complete.

Readers will note that the description above with regard to FIG. 7 explains self-pacing DMA data transfer operations for compute nodes in a parallel computer primarily from the perspective of an origin compute node. Turning now to a target compute node's perspective, FIG. 8 sets forth a flow chart illustrating a further exemplary method for self-pacing DMA data transfer operations for compute nodes in a parallel computer according to the present invention. The method of FIG. 8 includes receiving (802), by the target compute node (604), the RTS message (640) from an origin DMA engine on an origin compute node. As mentioned above, the RTS message (640) specifies an application message (601) on an origin compute node for transfer to the target compute node (604). The RTS message (640) is a control message used by an origin compute node to provide the target compute node (604) with information describing the application message (601) for transfer. The RTS message (640) may, for example, describe a memory location in which the message (601) is stored, a size of the application message (601), a DMA counter used to track when the message transfer is complete, and so on. In addition, a RTS message (640) may also provide the target compute node (604) with other information used to setup the data transfer of the message (601) from the origin node to the target node (604) as will occur to those of skill in the art.

After receiving the RTS message (640) specifying an application message (601) on an origin compute node for transfer to the target compute node (604), the target compute node (604) typically performs some initial setup operations to enable the target DMA engine (800) and the origin DMA engine to self-pace the data transfer of the application message (601) from the origin node to the target node (604). The method of FIG. 8, therefore, includes creating (804), by a target processing core (801) on the target compute node (604), the target RGET data descriptor (646), the DMA transfer operation data descriptor (642), and the additional DMA transfer operation data descriptor (648). The DMA transfer operation data descriptor (642) of FIG. 8 specifies a DMA data transfer operation for transmitting a portion (603) of the application message (601) to the target compute node (604). The additional DMA transfer operation data descriptor (648) of FIG. 8 specifies an additional DMA data transfer operation for transmitting an additional portion (605) of the application message (601) to the target compute node (604). The target processing core (801) may create the DMA transfer operation data descriptor (642) and the additional DMA transfer operation data descriptor (648) according to the method of FIG. 8 using the information provided by the RTS message (640) regarding the application message (601).

Figure 8:
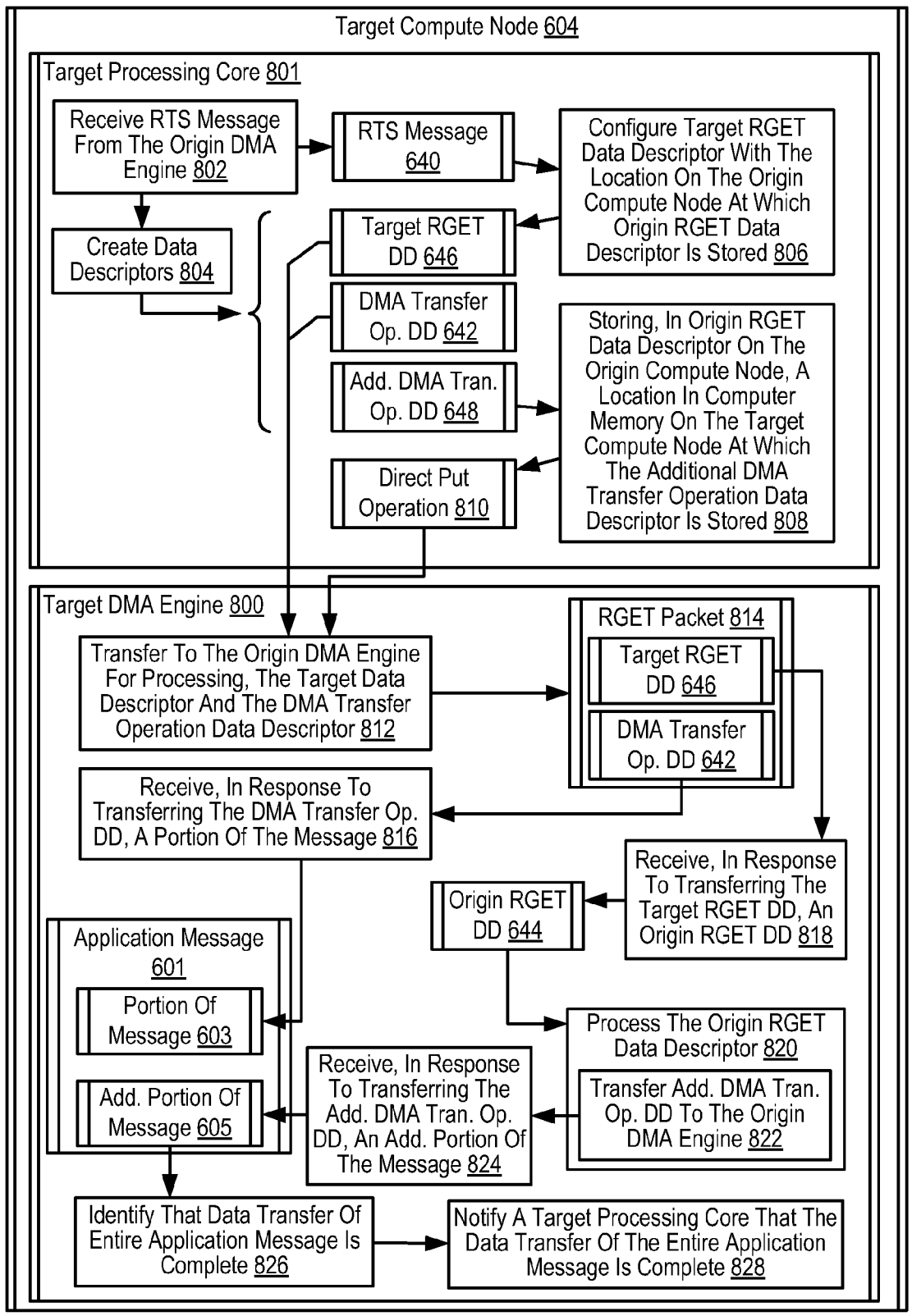
FIG. 8 sets forth a flow chart illustrating a further exemplary method for self-pacing DMA data transfer operations for compute nodes in a parallel computer according to the present invention.

The target RGET data descriptor (646) of FIG. 8 is used by the target DMA engine (800) to ensure that the additional DMA transfer operation data descriptor (648) is transferred to the origin DMA engine for processing after the DMA transfer operation data descriptor (642) is transferred to the origin DMA engine for processing without invoking a processing core on either the origin node or the target node (604). To prevent the invocation of any processing cores, the target RGET data descriptor (646) instructs the origin DMA engine to transfer the origin RGET data descriptor (644) to the target DMA engine (800). The origin RGET data descriptor (644), in turn, instructs the target DMA engine (800) to transfer the additional DMA transfer operation data descriptor (648) to the origin DMA engine for processing.

In order for the target RGET data descriptor (646) to instruct the origin DMA engine to transfer the origin RGET data descriptor (644) to the target DMA engine (800), the target RGET data descriptor (646) must specify the origin RGET data descriptor (644) on the origin compute node. As such, the method of FIG. 8 includes configuring (806), by the target processing core (801) according to the RTS message (640), the target RGET data descriptor (646) with the location in the computer memory on the origin compute node at which the origin RGET data descriptor (644) is stored. Readers will recall from above that the origin compute node may configured the RTS message (640) with the location in the computer memory on the origin compute node at which the origin RGET data descriptor (644) is stored.

As mentioned above, the origin RGET data descriptor (644) is used to instruct the target DMA engine (800) to transfer the additional DMA transfer operation data descriptor (648) to the origin DMA engine for processing. In order for the origin RGET data descriptor (644) to instruct the target DMA engine (800) to transfer the additional DMA transfer operation data descriptor (648) to the origin DMA engine for processing, the origin RGET data descriptor (644) must specify the additional DMA transfer operation data descriptor (648) on the target compute node (604). As such, the method of FIG. 8 includes storing (808), by the target processing core (801) in the origin RGET data descriptor (644) on the origin compute node using direct put operation (810), a location in computer memory on the target compute node (604) at which the additional DMA transfer operation data descriptor (648) is stored. The target processing core (801) may store (808) the location in computer memory on the target compute node (604) at which the additional DMA transfer operation data descriptor (648) is stored in the origin RGET data descriptor (644) on the origin compute node using direct put operation (810) according to the method of FIG. 8 using the information provided in the RTS message (640) regarding the origin RGET data descriptor (644).

The method of FIG. 8 includes transferring (812), by the target DMA engine (800) to the origin DMA engine for processing, the target RGET data descriptor (646) and the DMA transfer operation data descriptor (642). The target DMA engine (800) may transfer (812) the target RGET data descriptor (646) and the DMA transfer operation data descriptor (642) to the origin DMA engine for processing according to the method of FIG. 8 by creating an RGET packet (814) having the target RGET data descriptor (646) and the DMA transfer operation data descriptor (642) as its payload and injecting the RGET packet (814) into the transmission stacks of the target node's network adapter for transmission to the origin compute node.

The method of FIG. 8 also includes receiving (816), by the target DMA engine (800) in response to transferring the DMA transfer operation data descriptor (642) to the origin DMA engine, a portion (603) of the application message (601). The target DMA engine (800) may receive (816) a portion (603) of the application message (601) according to the method of FIG. 8 by receiving network packets that encapsulate the message portion (603), unencapsulating the message portion (603) from the network packets, and storing the message portion (603) in computer memory of the target compute node (604).

The method of FIG. 8 includes receiving (818), by target DMA engine (800) in response to transferring the target RGET data descriptor (646), an origin RGET data descriptor (644). The target DMA engine (800) receives (818) the origin RGET data descriptor (644) according to the method of FIG. 8 by receiving an RGET packet having the origin RGET data descriptor (644) as its payload, unencapsulating the origin RGET data descriptor (644) from the RGET packet, and injecting the origin RGET data descriptor (644) into a target injection FIFO buffer for the target DMA engine (800).

The method of FIG. 8 also includes processing (820), by the target DMA engine (800), the origin RGET data descriptor (644). The target DMA engine (800) may process (820) the origin RGET data descriptor (644) according to the method of FIG. 8 by retrieving the additional DMA transfer operation data descriptor (648) specified by the origin RGET data descriptor (644) and creating a RGET packet having the additional DMA transfer operation data descriptor (648) as its payload and a packet header as specified by the origin RGET data descriptor (644).

Processing (820), by the target DMA engine (800), the origin RGET data descriptor (644) according to the method of FIG. 8 includes transferring (822) the additional DMA transfer operation data descriptor (648) to the origin DMA engine for processing. The origin DMA engine (800) may transfer (822) the additional DMA transfer operation data descriptor (648) to the origin DMA engine for processing according to the method of FIG. 8 by injecting the RGET packet having the additional DMA transfer operation data descriptor (648) as its payload into the transmission stack of the target node's network adapter for transmission to the origin compute node.

The method of FIG. 8 includes receiving (824), by the target DMA engine (800) in response to transferring the additional DMA transfer operation data descriptor (648), an additional portion (605) of the application message (601). The target DMA engine (800) may receive (824), in response to transferring the additional DMA transfer operation data descriptor (648), the additional message portion (605) according to the method of FIG. 8 by receiving network packets that encapsulate the additional message portion (605), unencapsulating the additional message portion (605) from the network packets, and storing the additional message portion (605) in computer memory of the target compute node (604).

The method of FIG. 8 also includes identifying (826), by the target DMA engine (800), that the data transfer of the entire application message (601) is complete. The target DMA engine (800) may identify (826) that the data transfer of the entire application message (601) is complete according to the method of FIG. 8 by determining whether a DMA counter used to track the message transfer has reached zero. If the DMA counter used to track the message transfer has reached zero, then the data transfer of the entire application message (601) is complete. The data transfer of the entire application message (601) is not complete, however, if the DMA counter used to track the message transfer has not reached zero.

The method of FIG. 8 includes notifying (828), by the target DMA engine (800), a target processing core (801) on the target compute node (604) that the data transfer of the entire application message (601) is complete. The target DMA engine (800) may notify (828) the target processing core (801) on the target compute node (604) that the data transfer of the entire application message (601) is complete according to the method of FIG. 8 by triggering an interrupt when a DMA counter used to track the message transfer reaches zero, thereby notifying the target processing core (801) that the data transfer of the entire application message (601) is complete. The target DMA engine (800) may notify (828) the target processing core (801) on the target compute node (604) that the data transfer of the entire application message (601) is complete according to the method of FIG. 8 by setting a bit in a DMA counter status register corresponding to a DMA counter used to track the message transfer when the DMA counter reaches zero. When the target processing core (801) polls the DMA counter status register, the target processing core (801) is notified that the data transfer of the entire application message (601) is complete.

Figure 9:
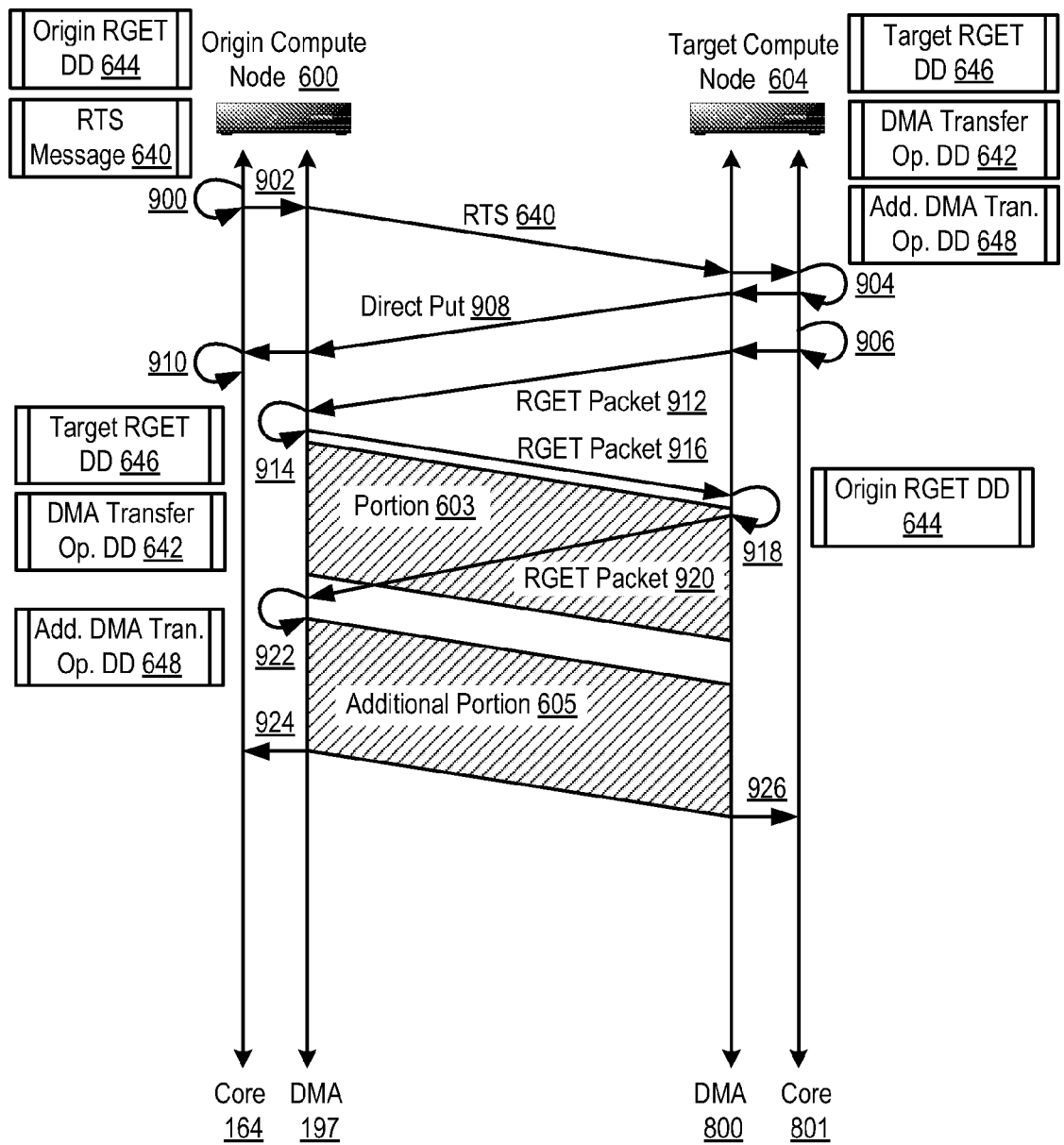
FIG. 9 sets forth a call sequence diagram illustrating an exemplary call sequence for self-pacing DMA data transfer operations for compute nodes in a parallel computer according to the present invention.

For further explanation, FIG. 9 sets forth a call sequence diagram illustrating an exemplary call sequence for self-pacing DMA data transfer operations for compute nodes in a parallel computer according to the present invention. The exemplary call sequence diagram includes an origin compute node (600) and a target compute node (604). The origin compute node (600) includes a processing core (164) and an origin DMA engine (197). The target compute node (604) includes a processing core (801) and a target DMA engine (800).

In the exemplary call sequence diagram of FIG. 9, the origin processing core (164) creates (900) and RTS message (640) and the origin RGET data descriptor (644). As mentioned above, the RTS message (640) specifies an application message on the origin compute node (600) for transfer to the target compute node (604). The origin processing core (164) then configures the RTS message (640) with a location in computer memory on the origin compute node (600) at which the origin RGET data descriptor (644) is stored and transfers (902) a RTS message (640) to the target compute node (604).

The target compute node (604) of FIG. 9 receives (904) the RTS message (640) from the origin DMA engine. Upon receiving (904) the RTS message (640), the target processing core (801), creates (904) a target RGET data descriptor (646), a DMA transfer operation data descriptor (642), and an additional DMA transfer operation data descriptor (648). The DMA transfer operation data descriptor (642) of FIG. 9 specifies a DMA data transfer operation for transmitting a portion (603) of the application message to the target compute node (604). The additional DMA transfer operation data descriptor (648) of FIG. 9 specifies an additional DMA data transfer operation for transmitting an additional portion (605) of the application message to the target compute node (604). The target RGET data descriptor (646) of FIG. 9 is used to create a link between the DMA transfer operation data descriptor (642) and the additional DMA transfer operation data descriptor (648).

To create a link between the DMA transfer operation data descriptor (642) and the additional DMA transfer operation data descriptor (648), the target RGET data descriptor (646), which is transferred to the origin DMA engine (197) with the DMA transfer operation data descriptor (642), must specify the origin RGET data descriptor (644), which in turn, specifies the additional DMA transfer operation data descriptor (648). As such, the target processing core (801) of FIG. 9 configures (904) the target RGET data descriptor (646) with the location in the computer memory on the origin compute node at which the origin RGET data descriptor (644) is stored as specified in the RTS message (640). To allow the origin RGET data descriptor (644) to specify the additional DMA transfer operation data descriptor (648), the target processing core (801) of FIG. 9 stores (904), in the origin RGET data descriptor (644) on the origin compute node (600) using direct put operation (908), a location in computer memory on the target compute node (604) at which the additional DMA transfer operation data descriptor (648) is stored.

In the exemplary call sequence diagram of FIG. 9, the target processing core (801) transfers (906) the target RGET data descriptor (646) and the DMA transfer operation data descriptor (642) to the origin DMA engine (197) for processing. The target processing core may transfer (906) the target RGET data descriptor (646) and the DMA transfer operation data descriptor (642) to the origin DMA engine (197) in the example of FIG. 9 by instructing the target DMA engine (800) to encapsulate the target RGET data descriptor (646) and the DMA transfer operation data descriptor (642) in an RGET packet (912) and transmit the RGET packet to the origin DMA engine (197).

In the exemplary call sequence diagram of FIG. 9, the origin DMA engine (197) receives (914) the target RGET data descriptor (646) followed by the DMA transfer operation data descriptor (642) in an origin injection FIFO buffer for the origin DMA engine (197) in response to transferring the RTS message (640). The origin DMA engine (197) processes (914) the target RGET data descriptor (646) by encapsulating the origin RGET data descriptor (644) specified by the target RGET data descriptor (646) into an RGET packet (916) and transferring the origin RGET data descriptor (644) to the target DMA engine (800) for injection into a target injection FIFO buffer for the target DMA engine (800). The origin DMA engine (197) also processes (914) the DMA transfer operation data descriptor (642) by encapsulating the message portion (603) into network packets and transferring the message portion (603) specified by the DMA transfer operation data descriptor (642) to the target compute node (604).

The target DMA engine (197) of FIG. 9 receives (918) the origin RGET data descriptor (644) from the origin DMA engine (197). In the example of FIG. 9, the target DMA engine (197) processes (918) the origin RGET data descriptor (644) by encapsulating the additional DMA transfer operation data descriptor (648) specified by the origin RGET data descriptor (644) into an RGET packet (920) and transfers the additional DMA transfer operation data descriptor (648) to the origin DMA engine (197).

In the exemplary call sequence diagram of FIG. 9, the origin DMA engine (197) receives (922), in response to transferring the origin RGET data descriptor (644) to the target DMA engine (800), the additional DMA transfer operation data descriptor (648) in the origin injection FIFO buffer (628). The origin DMA engine (197) processes (922) the additional DMA transfer operation data descriptor (648) by encapsulating the additional message portion (605) into network packets and transferring the additional message portion (605) specified by the additional DMA transfer operation data descriptor (648) to the target compute node (604).

In the exemplary call sequence diagram of FIG. 9, the origin DMA engine (197) identifies (924) that the data transfer of the entire application message is complete and notifies (924) the origin processing core (164) that the data transfer of the entire application message is complete. Similarly, the target DMA engine (800) identifies (926) that the data transfer of the entire application message is complete and notifies (926) the target processing core (801) that the data transfer of the entire application message is complete.

Exemplary embodiments of the present invention are described largely in the context of a fully functional computer system for self-pacing DMA data transfer operations for compute nodes in a parallel computer. Readers of skill in the art will recognize, however, that the present invention also may be embodied in a computer program product disposed on computer readable media for use with any suitable data processing system. Such computer readable media may be recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for self-pacing Direct Memory Access ('DMA') data transfer operations for compute nodes in a parallel computer, the method comprising:

transferring, by an origin DMA engine on an origin compute node, a request to send ('RTS') message to a target compute node, the RTS message specifying an application message on the origin compute node for transfer to the target compute node;

receiving, in an origin injection first-in-first-out ('FIFO') buffer for the origin DMA engine from a target DMA engine on the target compute node in response to transferring the RTS message, a target RGET data descriptor followed by a DMA transfer operation data descriptor, the DMA transfer operation data descriptor specifying a DMA data transfer operation for transmitting a portion of the application message to the target compute node, the target RGET data descriptor specifying an origin RGET data descriptor on the origin compute node, the origin RGET data descriptor specifying an additional DMA transfer operation data descriptor that specifies an additional DMA data transfer operation for transmitting an additional portion of the application message to the target compute node;

processing, by the origin DMA engine, the target RGET data descriptor, including transferring the origin RGET data descriptor to the target DMA engine for injection into a target injection FIFO buffer for the target DMA engine; and processing, by the origin DMA engine, the DMA transfer operation data descriptor, including transferring the portion of the application message specified by the DMA transfer operation data descriptor to the target compute node.

2. The method of claim 1 further comprising:

receiving, in the origin injection FIFO buffer by the origin DMA engine from the target DMA engine in response to transferring the origin RGET data descriptor to the target DMA engine, the additional DMA transfer operation data descriptor; and processing, by the origin DMA engine, the additional DMA transfer operation data descriptor, including transferring the additional portion of the application message specified by the additional DMA transfer operation data descriptor to the target compute node.

3. The method of claim 1 further comprising:

receiving, by the target compute node, the RTS message from the origin DMA engine; and transferring, by the target DMA engine to the origin DMA engine for processing, the target RGET data descriptor and the DMA transfer operation data descriptor.

4. The method of claim 1 further comprising:

creating, by an origin processing core on the origin compute node, the origin RGET data descriptor;

configuring, by the origin processing core, the RTS message with a location in computer memory on the origin compute node at which the origin RGET data descriptor is stored;

creating, by a target processing core on the target compute node, the target RGET data descriptor, the DMA transfer operation data descriptor, and the additional DMA transfer operation data descriptor;

configuring, by the target processing core according to the RTS message, the target RGET data descriptor with the location in the computer memory on the origin compute node at which the origin RGET data descriptor is stored; and storing, by the target processing core in the origin RGET data descriptor on the origin compute node using direct put operation, a location in computer memory on the target compute node at which the additional DMA transfer operation data descriptor is stored.

5. The method of claim 1 further comprising:

identifying, by the origin DMA engine, that the data transfer of the entire application message is complete; and notifying, by the origin DMA engine, an origin processing core on the origin compute node that the data transfer of the entire application message is complete.

6. The method of claim 1 further comprising:
identifying, by the target DMA engine, that the data transfer of the entire application message is complete; and
notifying, by the target DMA engine, a target processing core on the target compute node that the data transfer of the entire application message is complete.

7. The method of claim 1 wherein the origin compute node and the target compute node are comprised in the parallel computer, the parallel computer comprising a plurality of compute nodes connected for data communications through the data communications network, the data communications network optimized for point to point data communications.

8. A parallel computer for self-pacing Direct Memory Access ('DMA') data transfer operations for compute nodes, the parallel computer comprising a plurality of computer processors, a plurality of DMA controllers, a DMA engine installed upon each DMA controller, and computer memory operatively coupled to the computer processors, the DMA controller, and the DMA engine, the computer memory having disposed within it computer program instructions capable of:
transferring, by an origin DMA engine on an origin compute node, a request to send ('RTS') message to a target compute node, the RTS message specifying an application message on the origin compute node for transfer to the target compute node;
receiving, in an origin injection first-in-first-out ('FIFO') buffer for the origin DMA engine from a target DMA engine on the target compute node in response to transferring the RTS message, a target RGET data descriptor followed by a DMA transfer operation data descriptor, the DMA transfer operation data descriptor specifying a DMA data transfer operation for transmitting a portion of the application message to the target compute node, the target RGET data descriptor specifying an origin RGET data descriptor on the origin compute node, the origin RGET data descriptor specifying an additional DMA transfer operation data descriptor that specifies an additional DMA data transfer operation for transmitting an additional portion of the application message to the target compute node;
processing, by the origin DMA engine, the target RGET data descriptor, including transferring the origin RGET data descriptor to the target DMA engine for injection into a target injection FIFO buffer for the target DMA engine; and
processing, by the origin DMA engine, the DMA transfer operation data descriptor, including transferring the portion of the application message specified by the DMA transfer operation data descriptor to the target compute node.

9. The parallel computer of claim 8 wherein the computer memory also has disposed within it computer program instructions capable of:
receiving, in the origin injection FIFO buffer by the origin DMA engine from the target DMA engine in response to transferring the origin RGET data descriptor to the target DMA engine, the additional DMA transfer operation data descriptor; and
processing, by the origin DMA engine, the additional DMA transfer operation data descriptor, including transferring the additional portion of the application message specified by the additional DMA transfer operation data descriptor to the target compute node.

10. The parallel computer of claim 8 wherein the computer memory also has disposed within it computer program instructions capable of:
receiving, by the target compute node, the RTS message from the origin DMA engine; and
transferring, by the target DMA engine to the origin DMA engine for processing, the target RGET data descriptor and the DMA transfer operation data descriptor.

11. The parallel computer of claim 8 wherein the computer memory also has disposed within it computer program instructions capable of:
creating, by an origin processing core on the origin compute node, the origin RGET data descriptor;
configuring, by the origin processing core, the RTS message with a location in computer memory on the origin compute node at which the origin RGET data descriptor is stored;
creating, by a target processing core on the target compute node, the target RGET data descriptor, the DMA transfer operation data descriptor, and the additional DMA transfer operation data descriptor;
configuring, by the target processing core according to the RTS message, the target RGET data descriptor with the location in the computer memory on the origin compute node at which the origin RGET data descriptor is stored; and
storing, by the target processing core in the origin RGET data descriptor on the origin compute node using direct put operation, a location in computer memory on the target compute node at which the additional DMA transfer operation data descriptor is stored.

12. The parallel computer of claim 8 wherein the computer memory also has disposed within it computer program instructions capable of:
identifying, by the origin DMA engine, that the data transfer of the entire application message is complete; and
notifying, by the origin DMA engine, an origin processing core on the origin compute node that the data transfer of the entire application message is complete.

13. A computer program product for self-pacing Direct Memory Access ('DMA') data transfer operations for compute nodes in a parallel computer, the computer program product disposed upon a non-transitory computer readable medium, the computer program product comprising computer program instructions capable of:
transferring, by an origin DMA engine on an origin compute node, a request to send ('RTS') message to a target compute node, the RTS message specifying an application message on the origin compute node for transfer to the target compute node;
receiving, in an origin injection first-in-first-out ('FIFO') buffer for the origin DMA engine from a target DMA engine on the target compute node in response to transferring the RTS message, a target RGET data descriptor followed by a DMA transfer operation data descriptor, the DMA transfer operation data descriptor specifying a DMA data transfer operation for transmitting a portion of the application message to the target compute node, the target RGET data descriptor specifying an origin RGET data descriptor on the origin compute node, the origin RGET data descriptor specifying an additional DMA transfer operation data descriptor that specifies an additional DMA data transfer operation for transmitting an additional portion of the application message to the target compute node;
processing, by the origin DMA engine, the target RGET data descriptor, including transferring the origin RGET data descriptor to the target DMA engine for injection into a target injection FIFO buffer for the target DMA engine; and processing, by the origin DMA engine, the DMA transfer operation data descriptor, including transferring the portion of the application message specified by the DMA transfer operation data descriptor to the target compute node.

14. The computer program product of claim 13 further comprising computer program instructions capable of:

receiving, in the origin injection FIFO buffer by the origin DMA engine from the target DMA engine in response to transferring the origin RGET data descriptor to the target DMA engine, the additional DMA transfer operation data descriptor; and processing, by the origin DMA engine, the additional DMA transfer operation data descriptor, including transferring the additional portion of the application message specified by the additional DMA transfer operation data descriptor to the target compute node.

15. The computer program product of claim 13 further comprising computer program instructions capable of:

receiving, by the target compute node, the RTS message from the origin DMA engine; and transferring, by the target DMA engine to the origin DMA engine for processing, the target RGET data descriptor and the DMA transfer operation data descriptor.

16. The computer program product of claim 13 further comprising computer program instructions capable of:

creating, by an origin processing core on the origin compute node, the origin RGET data descriptor;

configuring, by the origin processing core, the RTS message with a location in computer memory on the origin compute node at which the origin RGET data descriptor is stored;

creating, by a target processing core on the target compute node, the target RGET data descriptor, the DMA transfer operation data descriptor, and the additional DMA transfer operation data descriptor;

configuring, by the target processing core according to the RTS message, the target RGET data descriptor with the location in the computer memory on the origin compute node at which the origin RGET data descriptor is stored; and storing, by the target processing core in the origin RGET data descriptor on the origin compute node using direct put operation, a location in computer memory on the target compute node at which the additional DMA transfer operation data descriptor is stored.

17. The computer program product of claim 13 further comprising computer program instructions capable of:

identifying, by the origin DMA engine, that the data transfer of the entire application message is complete; and notifying, by the origin DMA engine, an origin processing core on the origin compute node that the data transfer of the entire application message is complete.

18. The computer program product of claim 13 further comprising computer program instructions capable of:

identifying, by the target DMA engine, that the data transfer of the entire application message is complete; and notifying, by the target DMA engine, a target processing core on the target compute node that the data transfer of the entire application message is complete.

* * * * *